Sept. 16, 1952 W. A. WILLIAMS 2,610,515
ADJUSTABLE DIAMETER SHEAVE
Filed Feb. 24, 1949 7 Sheets-Sheet 1
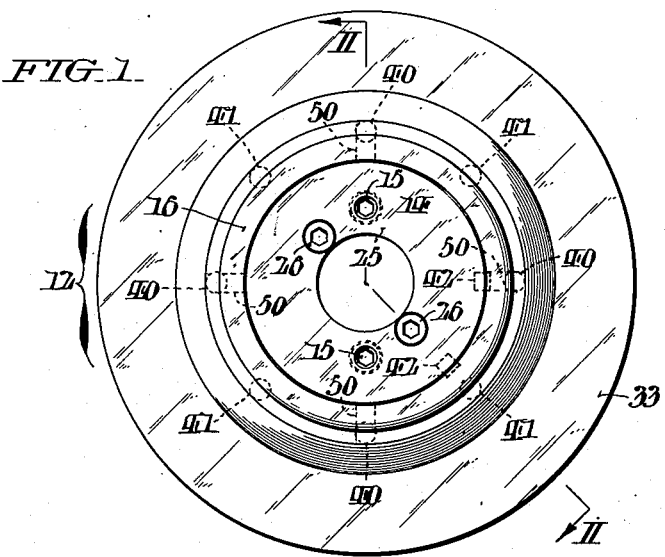
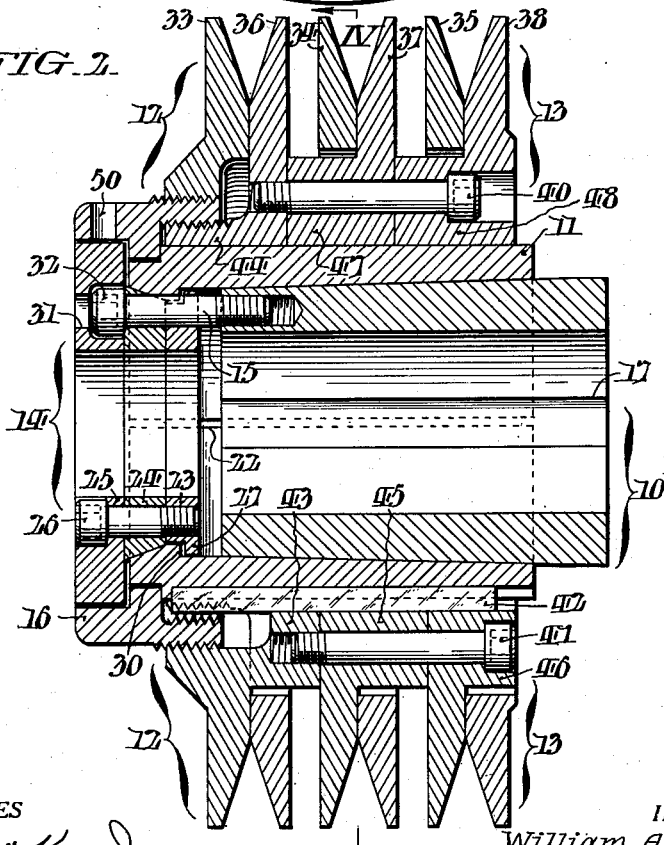
WITNESSES
Thomas W. Kerr, Jr.
A. J. Brittingham
INVENTOR:
William A. Williams,
BY Paul & Paul
ATTORNEYS.

Sept. 16, 1952 W. A. WILLIAMS 2,610,515
ADJUSTABLE DIAMETER SHEAVE
Filed Feb. 24, 1949 7 Sheets-Sheet 2
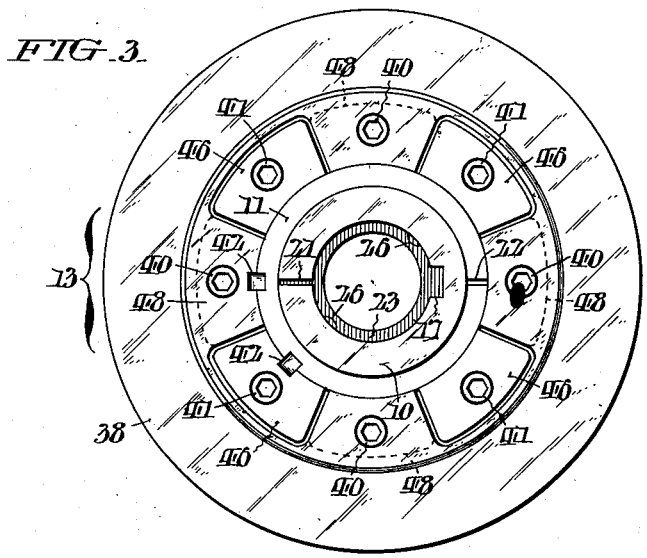
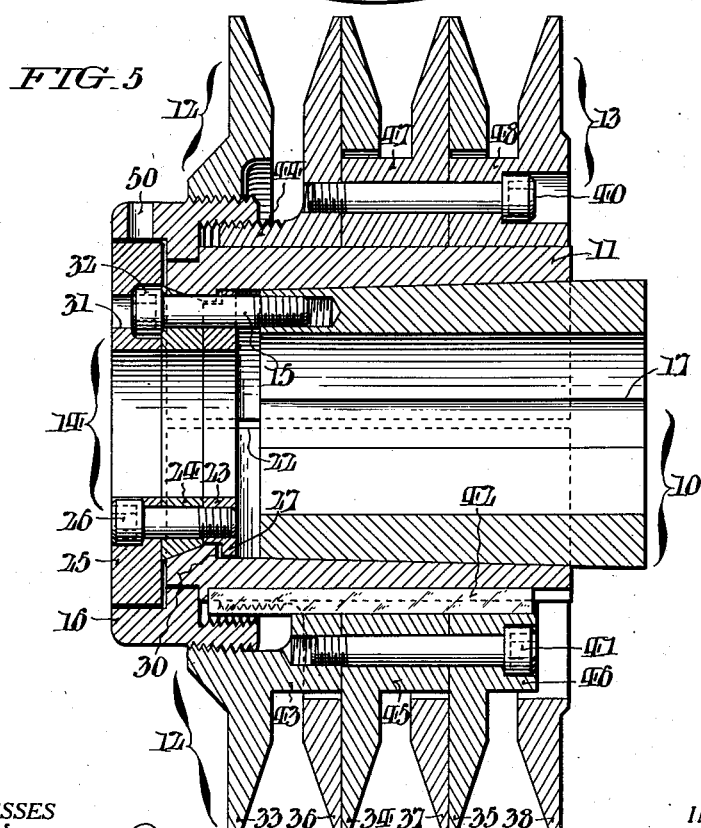
WITNESSES
Thomas W. Kerr, Jr.
A. J. Brittingham
INVENTOR:
William A. Williams.,
BY Paul & Paul
ATTORNEYS.

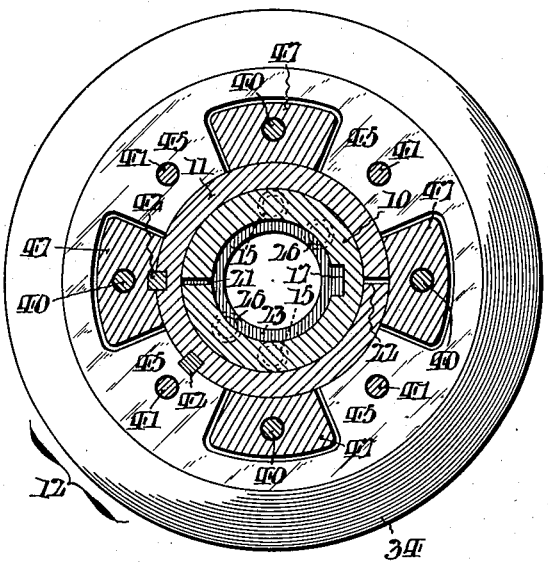

Sept. 16, 1952 W. A. WILLIAMS 2,610,515
ADJUSTABLE DIAMETER SHEAVE
Filed Feb. 24, 1949 7 Sheets-Sheet 4
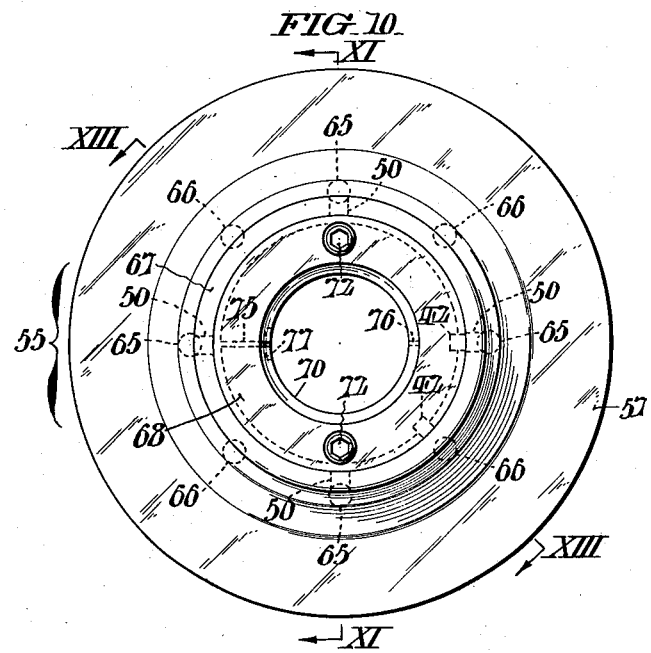
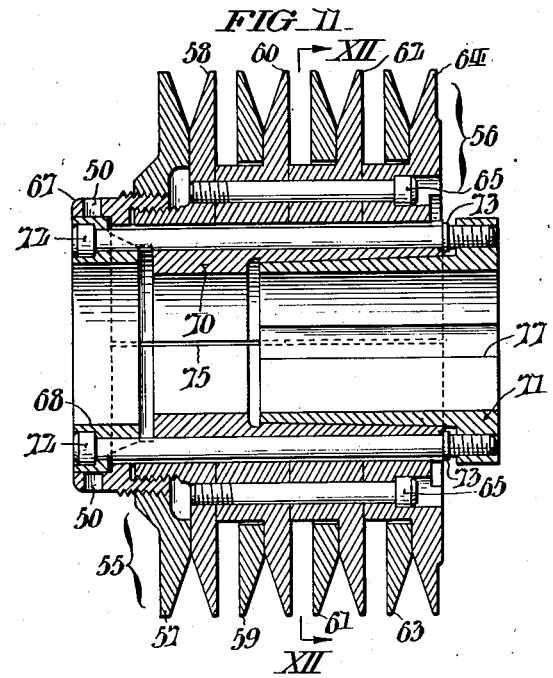
WITNESSES
Thomas W. Kerr, Jr
A. J. Brittingham
INVENTOR:
William A. Williams.,
BY Paul & Paul
ATTORNEYS.

Sept. 16, 1952      W. A. WILLIAMS      2,610,515

ADJUSTABLE DIAMETER SHEAVE

Filed Feb. 24, 1949      7 Sheets-Sheet 5

WITNESSES

INVENTOR:
William A. Williams.,
BY Paul & Paul
ATTORNEYS.

Sept. 16, 1952　　　　　　W. A. WILLIAMS　　　　　　2,610,515
ADJUSTABLE DIAMETER SHEAVE
Filed Feb. 24, 1949　　　　　　　　　　　　　　　7 Sheets-Sheet 6
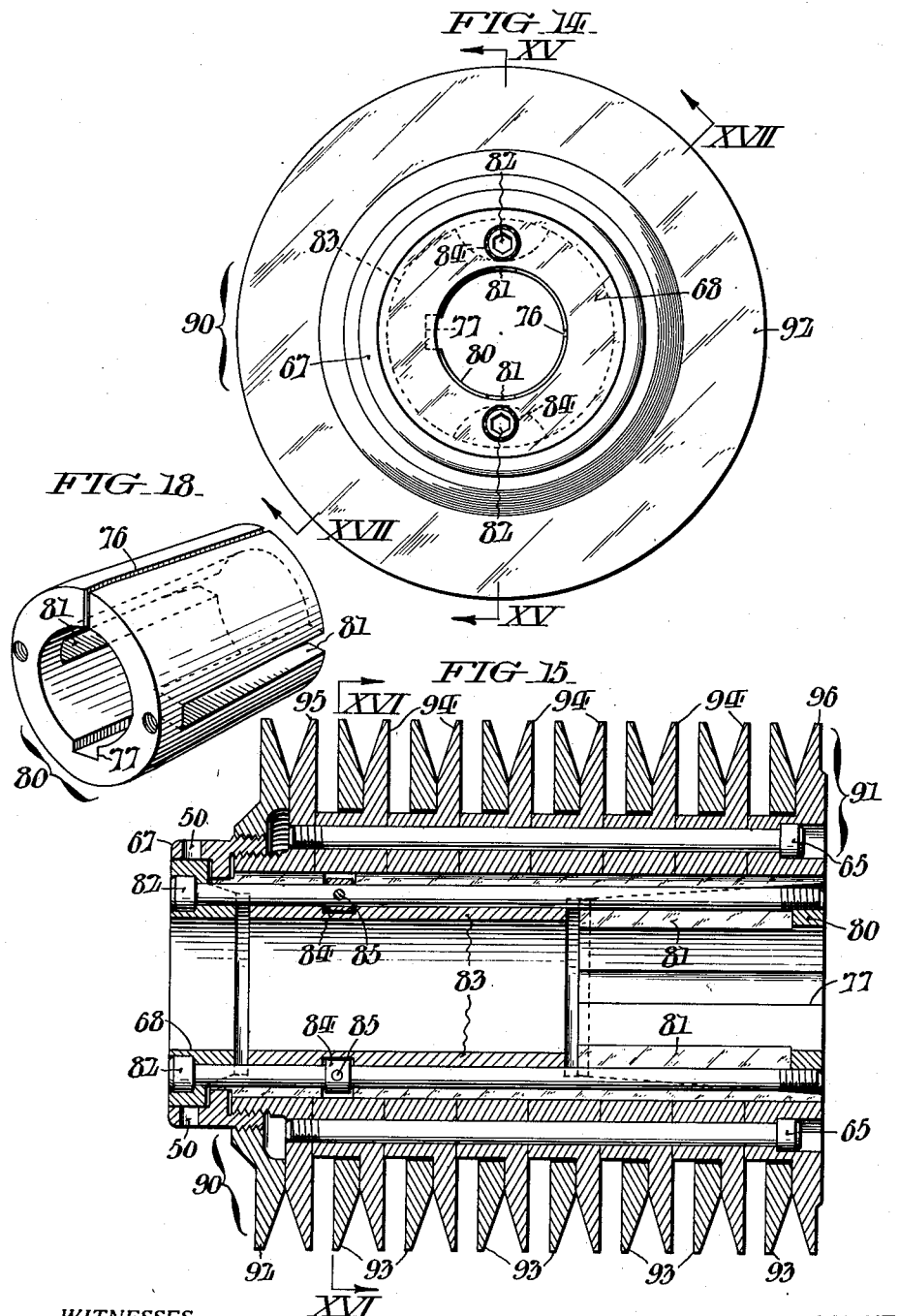
WITNESSES
Thomas W. Kerr, Jr.
A. J. Brittingham
INVENTOR:
William A. Williams,
BY Paul & Paul
ATTORNEYS.

Sept. 16, 1952  W. A. WILLIAMS  2,610,515
ADJUSTABLE DIAMETER SHEAVE
Filed Feb. 24, 1949  7 Sheets-Sheet 7

WITNESSES
Thomas W. Kerr, Jr.
A. J. Brittingham

INVENTOR:
William A. Williams,
BY Paul & Paul
ATTORNEYS.

Patented Sept. 16, 1952

2,610,515

UNITED STATES PATENT OFFICE 2,610,515

ADJUSTABLE DIAMETER SHEAVE

William A. Williams, Philadelphia, Pa., assignor to The American Pulley Company, Philadelphia, Pa., a corporation of Pennsylvania Application February 24, 1949, Serial No. 78,116

18 Claims. (Cl. 74—230.17)

This invention relates generally to adjustable diameter sheaves and more particularly to a form thereof which is so constructed that any tendency of such sheaves to become non-adjustable because of rust or corrosion is substantially eliminated.

In the very beginning of the development of the multiple groove adjustable sheave, the art encountered the difficulty of the freezing of the movable parts due to rust or corrosion or the like. The result of such freezing was the loss of the important feature of adjustability and, in effect, the conversion of the sheave from an adjustable one into a fixed and non-adjustable one. This problem has been a continuing one in the art in spite of numerous efforts to solve it by a variety of means. The present invention, as its principal object, is directed toward the solution of this problem and provides a multiple groove adjustable diameter sheave which is not subject to the defect of freezing of the movable parts by which the adjustment feature is obtained. This invention combines easy and permanent adjustability with positive locking and fixing of the sheave for running condition. The invention involves the provision of an expandible and contractible hub by a means which combines powerful expansive capacity with positive release thereof to overcome any freezing tendency. Another advantage of this invention is that it permits a very large bore and a small outside diameter when needed. This is particularly important where the sheave must be within the hub sizes available and yet have a very large bore.

Still further objects and advantages of this invention will become apparent from the following detailed description of a preferred embodiment thereof with suggested modified forms, as illustrated in the accompanying drawings.

Fig. 1 of these drawings is an end elevation of a multiple groove adjustable sheave illustrating a preferred form of the invention;

Fig. 2 is a longitudinal sectional view of the same taken as indicated by the lines and arrows II—II in Fig. 1;

Fig. 3 is an end elevation taken oppositely to that shown in Fig. 1;

Fig. 4 is a transverse sectional view of the same taken as indicated by the lines and arrows IV—IV in Fig. 2;

Fig. 5 is a longitudinal sectional view similar to Fig. 2 showing various parts in their moved position;

Fig. 6 is an exploded perspective view of a tapered ring;

Fig. 7 is a perspective view of a flange showing the nesting lug flanges;

Fig. 8 is a perspective view of another type of flange included in the assembled flange unit;

Fig. 9 is a perspective view of still another type of flange included in the assembled flange unit;

Fig. 10 is an end elevation similar to Fig. 1, of a modified form of pulley sheave;

Fig. 11 is a longitudinal sectional view of the same similar to Fig. 2 taken as indicated by the lines and arrows XI—XI in Fig. 10;

Fig. 14 is another end elevation of a second modified form of pulley sheave;

Fig. 15 is a longitudinal sectional view of the same taken as indicated by the lines and arrows XV—XV in Fig. 14;

Fig. 18 is a perspective view of one form of a tapered bushing.

Figure 12:
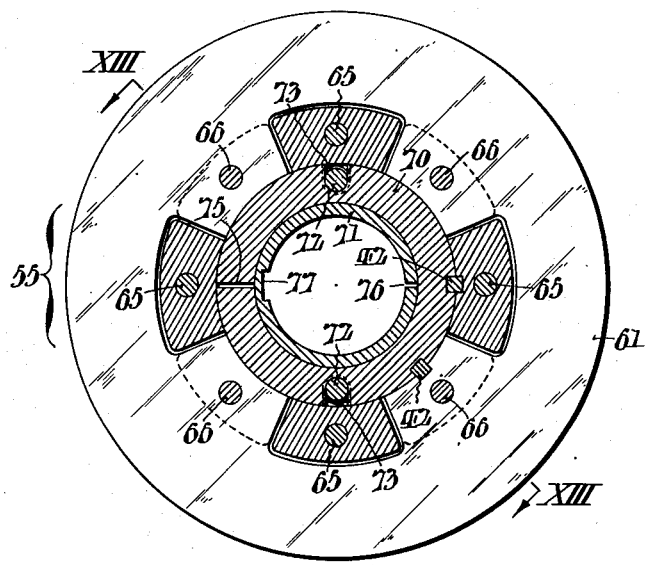
Fig. 12 is a transverse sectional view of the same, similar to Fig. 4, taken as indicated by the lines and arrows XII—XII in Fig. 11.

In describing the embodiments of this invention shown in the drawings, a specific terminology will be adopted for the purpose of clarity, but it is to be understood that it is not intended thereby to limit the invention to this detailed description of an illustrative embodiment thereof. Each term adopted is intended to include all equivalents thereof which operate in a substantially similar manner to accomplish a substantially similar result.

The invention shown in the drawings may be analyzed conveniently into the following principal elements in order to facilitate a detailed description thereof: a split exteriorly tapered bushing 10, a split interiorly tapered hub 11, complementary multiple flange units 12 and 13 mounted on said hub 11, a tapered wedge element in the form of a ring 14 carrying draw bolts 15, and a flange adjustment ring 16 in threaded engagement with both of said multiple flange units 12 and 13, said bolts being constrained against axial movement in said wedge element.

The split exteriorly tapered bushing 10 is formed with an interior key-way 17 for keyed engaged with a shaft, not shown, and with a longitudinally extending split 21. The split 21 permits the bushing 10 to be compressed into a gripping engagement with a shaft when the sheave is mounted thereon which avoids looseness and resulting vibration. The bushing is likewise rendered capable of expansion to facilitate the removal of the pulley from the shaft on which it is mounted. This bushing 10 is slidably mounted within the hub 11 which is interiorly tapered to correspond with the exterior tapering of the bushing 10. A longitudinally extending split 22 is provided in the hub 11 to permit expansion by the operative effects of the bushing 11. It will be clear from the above description that in the assembly of the pulley, the bushing 10 is under compression and the hub 11 is under expansion. In this way the shaft is positively gripped by the compressed bushing 10 and the flange units 12 and 13 positively grip the expanded hub 11.

In order to force the hub 11 and bushing 10 in operative longitudinal movement relative to each other, a tapered ring 14 is provided. This ring 14 is composed of three elements 23, 24 and 25 assembled into a unit by means of screws 26. See exploded perspective view in Fig. 6. The element 23 is formed with a flange 27 to cooperate with a corresponding circumferential ledge 30 or shoulder formed in the hub 11 when pressure is being exerted to move the bushing 10 outwardly by means of the draw bolts 15. The element 24 is exteriorly tapered to cooperate with similar interior tapering within an end of the hub 11. It will be noticed that this tapering between the element 24 and the end of the hub 11 is relatively steeper and sharper than that between the bushing 10 and hub 11. By providing the steep taper between the element 24 and the end of the hub 11, the operative disengagement between these elements becomes automatic as the draw bolts 15 are loosened. The steep taper eliminates the possibility of freezing between the elements. The element 25 which is mounted on the outer end of the element 24 is provided with two countersunk openings 31 to receive and partially enclose the Allen heads 32 of the draw bolts 15. Thus the heads 32 of the draw bolts 15 will abut against the element 25 when pressure is being applied to disengage the bushing 10 and the hub 11; and similarly, the heads 32 of the draw bolts 15 will abut against the outer face of the element 24 when pressure is being applied to engage the bushing 10 and the hub 11. The threaded ends of the draw bolts 15 are in threaded engagement with the inner end of the bushing 10. Since no additional radial space is needed in this construction to accommodate the draw bolts 15, a maximum size of bore with a minimum size of hub is attainable.

The multiple flange units 12 and 13 which are mounted on the hub 11 are complementary. That is: one unit 12 is made up of a plurality of similarly inclined flanges 33, 34, and 35, and the other unit 13 is made up of a plurality of similarly inclined flanges 36, 37 and 38. The flanges of unit 12 are oppositely inclined to the flanges of the unit 13. It will be clear from Figs. 2 and 5 of the drawings that the flange units 12 and 13 cooperate to form a plurality of adjustable sheaves, Fig. 2 showing the sheaves in the extreme closed position and Fig. 5 in the extreme open position. The component flanges of the flange units 12 and 13 are held together in units by means of the Allen headed bolts 40 and 41. The flange units 12 and 13 are keyed to the hub 11 by means of the conventional keys 42.

The flange 33 (see Fig. 7) is formed with axially extending lugs 43 which are equally spaced circumferentially to provide openings therebetween to receive lugs 44 formed on the flange 36 (see Fig. 8). The lugs 44 are threaded to engage the adjustment ring 16 which is also in threaded engagement with the flange 33 as shown in Fig. 2. The threads on the inside and outside of the adjustment ring 16 are opposite so that the rotation of the ring 16 will cause the flange units 11 and 12 to move in opposite directions as the ring 16 is rotated. The lugs 43 which extend through the flange 36 abut against the face of flange 34 (see Fig. 9). The flange 34 has similarly spaced lugs 45 which project through the adjacent flange 37 and abut against the face of the flange 35 which is formed with lugs 46 projecting through the adjacent flange 38. Each of the bolts 41, which bind the flange unit 12 into a unit, is in threaded engagement at one end with one of the lugs 43 on the flange 33 with its Allen head recessed into one of the lugs 46 on the flange 35. The flange unit 13 is similarly formed from the flanges 36, 37 and 38 which are bound together by the bolts 40, the lugs 47 and 48 extending through adjacent flanges 34 and 35.

In operation, the above described sheave is mounted on and keyed to a shaft by means of the key way 17 formed in the bushing 10. The flanges are adjusted to the desired position by turning the adjustment ring 16 by means of a spanner wrench inserted in holes 50 formed in the adjustment ring 16 for that purpose. The Allen headed draw bolts 15 are then tightened which causes the tapered ring 14 and the bushing 10 to be drawn toward each other, resulting in the contraction of the bushing 10 and the expansion of the hub 11 thereby fixing the flange units 12 and 13 tightly in place and at the same time causing the bushing 10 to grip the shaft tightly. It will been seen by reference to Fig. 2 that the tapered ring 14 exerts a concentrated expansion at the left end of the hub 11, and that the distributed effect of this force is a tightening of the threaded engagement between the adjustment ring 16 and the flanges 33 and 36. This has a locking effect to prevent rotation of the flange adjustment ring 16 when the sheave is in operation. As pointed out above, the taper of the tapered ring 14 is steep when compared with the taper of the bushing 10. This steep taper of the ring 14 insures easy withdrawal of the ring 14 from wedged engagement with the hub 11. It will be appreciated from the above description that all looseness in the assembled and operative sheave is eliminated with the destructive vibration caused by such looseness. When it becomes necessary to adjust the flange units 12 and 13 by rotating the ring 16, it is a very simple matter to loosen the assembly by turning the Allen headed draw bolts 15 so that the ring 14 and the bushing 10 are moved away from each other. In this loosening operation, the circumferential ledge 30 formed on the hub 11 abuts against the flange 27 formed on the ring 14, and the ring 14 is thereby anchored to support the draw bolts 15 for axial thrust transmitted to the bushing 10. In this way the hub 11 and the bushing 10 are moved axially and in opposite directions relative to each other. The loosening effect of this relative motion will be obvious.

Figure 13:
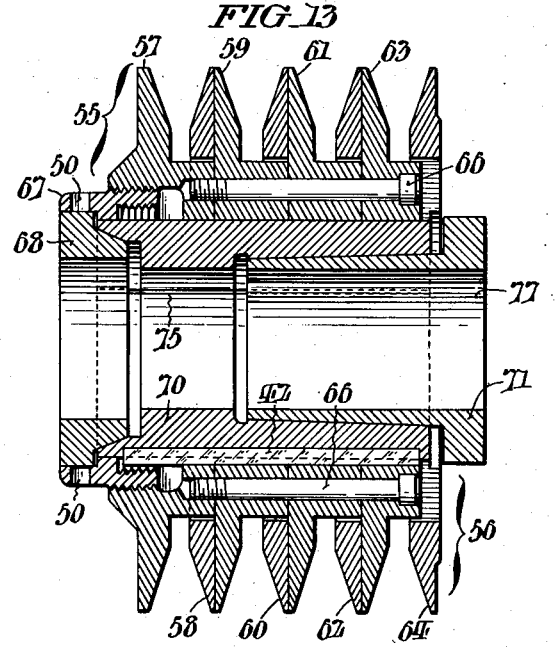
Fig. 13 is a longitudinal sectional view of the same, similar to Fig. 5 taken as indicated by the lines and arrows XIII—XIII in Figs. 10 and 12 and shown in their moved position.
Figure 16:
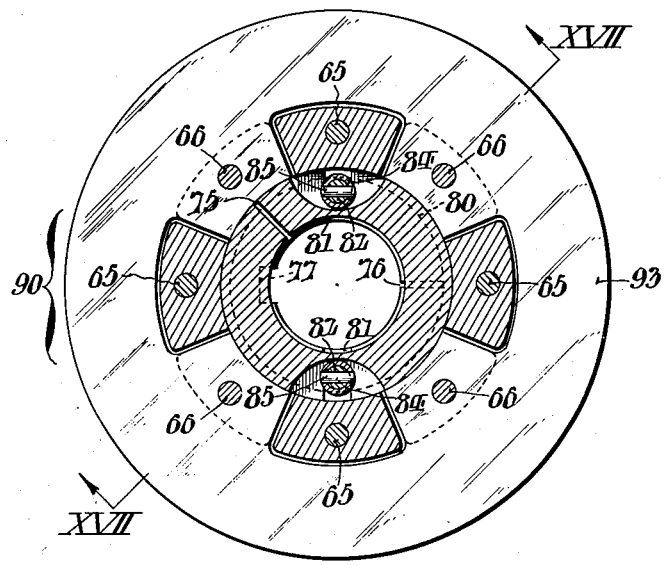
Fig. 16 is a transverse sectional view of the same taken as indicated by the lines and arrows XVI—XVI in Fig. 15.
Figure 17:
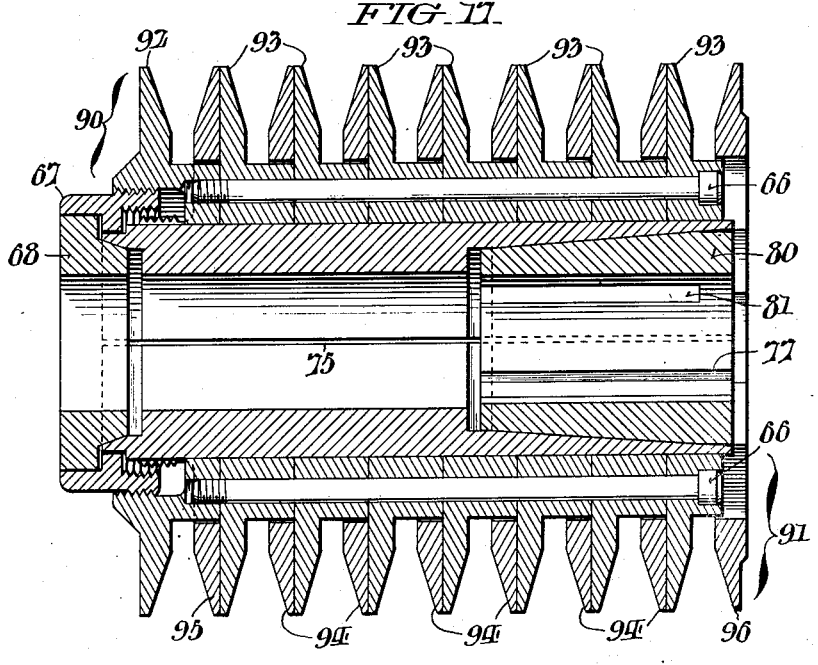
Fig. 17 is a longitudinal sectional view of the same taken as indicated by the lines and arrows XVII—XVII in Figs. 14 and 16 and shown in their moved position.

In Figs. 10 to 13 inclusive, a modified form of the invention is illustrated. It will be seen from the inspection of these figures of the drawings that the operative principle thereof is the same as that of the preferred form described above. Since the flange units 55 and 56 are similar to the above described flange units 12 and 13 respectively, a detailed descripiton would be superfluous. The unit 55 is made up of similarly inclined flanges 57, 59, 61 and 63, held together by the bolts 66 as shown in Fig. 13. The unit 56 is made up of similarly inclined flanges 58, 60, 62 and 64 held together by the bolts 65 as shown in Fig. 11. The flanges 57 and 58 are in threaded engagement with adjustment ring 67 which is generally similar to the previously described ring 16 in the preferred form. A tapered ring 68 in this modified form functions similarly to the tapered ring 16, but the former is all in one piece in contrast to the three component elements of ring 16. Further, the ring 68 does not have a flange like the flange 27 which interlocks the ring 16 with the hub 11. The function of the flange 27 in the preferred form is performed by a conventional collar or snap ring 73 on the draw bolts 72 as will be explained in more detail later. Hub 70 and bushing 71 are analogous to hub 11 and bushing 10 respectively in the preferred form and are similarly tapered and split at 75 and 76. The bushing 71 is keyed to a shaft by means of key way 77. Allen headed draw bolts 72 function similarly to the draw bolts 15 except that the draw bolts 72 carry snap rings 73 which abut against the end of the hub 70 when exerting thrust on the bushing 71. The draw bolts 72 are recessed in longitudinal channels formed in the hub 70 which permits a relatively large bore without unduly enlarging the hub size. The operation of this modified form will be obvious from the above description in view of the remarks relating to the operation of the preferred form.

A second modification of the invention is shown in Figs. 14 to 17 inclusive which is the same as the modification just described above except for bushing 80, hub 83 and Allen headed draw bolts 82. A greater number of flanges is shown in this second modification since it lends itself easily to a large number of sheaves with the bushing 80 completely within the hub 83. Elements in this second modification which are the same as corresponding elements in the first modification are therefore given the same identifying numerals in both modifications. The bushing 80 is formed with longitudinal slots 81 which give flexibility for compression and expansion and also receive the draw bolts 82 which threadedly engage the bushing 80. See Figs. 15 and 18. The bushing 80 and hub 83 are tapered as in the two forms described above and for the same purpose. Collars 84 are integrally mounted in a conventional fashion on the draw bolts 82 by means of pins 85. The collars 84 are recessed into the hub 83 as shown in Fig. 15 and provide an anchorage for the draw bolts 82 when exerting an axial thrust to the bushing 80. The function of this collar 84 is analogous to that of the collar or snap ring 73 shown in Fig. 11 and described in connection therewith. Flange unit 90 made up of flanges 92 and 93, and flange unit 91 made up of flanges 95, 94 and 96 are so similar to the other flange units described above that no detailed description will be necessary. The operation of this second modification is the same in principle as the other forms described above and will be clear from the above description.

While this invention has been described above in considerable detail and certain modifications thereof suggested, it will be apparent to those skilled in the art that various other changes and modifications may be made without departing from the spirit or scope of the invention as defined in the following claims.

Having thus described my invention, I claim:

1. In an adjustable diameter sheave, an exteriorly tapered bushing, an interiorly tapered split hub mounted on said bushing, a ring mounted in abutting relation to an end of said split hub, a draw bolt operatively connecting said ring and said bushing and a pair of complementary flanges mounted on said hub with capacity for axial movement relative to said hub and to each other.

2. The invention of claim 1 characterized further by the fact that said ring is tapered to correspond with a complementary interior tapering within the end of said split hub.

3. In an adjustable diameter sheave, an interiorly tapered split hub, an exteriorly tapered bushing slidably mounted within said interiorly tapered split hub, a tapered ring mounted in one end of said hub, an abutment means for preventing said tapered ring from being disengaged from said hub, a draw bolt rotatably mounted in said ring and restrained against axial movement relative to said ring, said draw bolt being in threaded engagement with said tapered bushing, and a pair of complementary flanges mounted on said hub with capacity for axial movement relative to said hub and to each other.

4. The invention of claim 3 characterized further by an adjustment ring in threaded engagement with said flanges whereby the rotation of said adjustment ring will cause said flanges to move in opposite axial directions.

5. The invention of claim 3 characterized further by the fact that said tapered bushing is longitudinally split.

6. The invention of claim 4 characterized further by the fact that said flanges are keyed to said hub.

7. In an adjustable diameter sheave, an exteriorly tapered split bushing, an interiorly tapered split hub mounted on said bushing, a tapered ring mounted in interlocking relation with said hub opposite the inner end of said bushing, a draw bolt mounted in said ring and having its outer end threadedly engaged with the inner end of said bushing, a pair of complementary flange units mounted on and keyed to said hub with capacity for controlled limited axial movement, and an adjustment ring in threaded engagement with each of said flange units and having capacity for rotary but not axial motion.

8. The invention of claim 3 characterized further by the fact that the taper of said tapered ring is relatively steep in comparison with the more gradual taper of said bushing.

9. The invention of claim 3 characterized further by the fact that said draw bolt is in threaded engagement with the inner end of said tapered bushing.

10. In an adjustable diameter sheave, an exteriorly tapered bushing, slidably mounted within an interiorly tapered split hub, a tapered ring mounted within one end of said hub, a draw bolt operatively connecting said ring and bushing, a collar mounted on said draw bolt to function by an abutting contact with said hub in order to transmit an axial thrust to said bushing, and a pair of complementary flanges mounted on said hub with capacity for axial movement relative to said hub and to each other.

11. The invention of claim 10 characterized further by the fact that said collar is recessed into the hub intermediate the ends thereof, and said draw bolt is recessed into a longitudinal groove.

12. The invention of claim 11 characterized further by the fact that said bushing is completely housed within said hub.

13. The invention of claim 12 characterized further by the fact that said bushing is cut away longitudinally over a portion of its length to receive the said draw bolt.

14. An adjustable diameter sheave comprising an exteriorly tapered bushing adapted to be mounted on a shaft, an interiorly tapered split hub, said hub being tapered oppositely and complementally to the tapering of said bushing and slidably positioned thereon; a rotatable threaded adjustment means mounted at one end of said hub and operatively connected to said bushing for positively forcing said bushing in axial movement relative to said hub without effecting the positioning of said bushing on a shaft, said adjustment means being exposed for operation, and a pair of flanges mounted on said hub, screw means rotatable about the aforesaid end of the hub for adjusting the flanges relative to each other to change the effective diameter of the sheave, and releasable means by which the flange adjusting means is fastened to the hub for security against displacement in adjusted positions.

15. The invention of claim 14 characterized further by the fact that a plurality of said rotatable threaded adjustment means is provided and positioned circumferentially at the end of said hub.

16. An adjustable diameter sheave comprising an exteriorly-tapered bushing, an internally tapered split hub, a pair of flanges mounted on said hub, means for adjusting the flanges relative to each other to change the effective diameter of the sheave, means at one end of said hub operatively connected to said bushing for positively forcing said bushing axially relative to said hub to effect contraction of said bushing and expansion of said hub, and releasable means connected to the hub for securing the flange adjusting means against accidental displacement in adjusted positions.

17. In a sheave, a split hub sleeve with its bore tapered inwardly from opposite ends; at least one pair of opposing sheave flanges mounted on the sleeve with capacity for being adjusted laterally relative to each other along the sleeve; tapered opposing wedge elements engaging into opposite ends of the hub bore; and means for drawing one wedge element toward the other to expand the hub sleeve within the sheave flanges.

18. In a sheave, a split hub sleeve with a bore having a long inward taper at one end, and a short and more abrupt taper at the opposite end terminating in an annular internal shoulder; at least one pair of opposing sheave flanges mounted on the sleeve with capacity for adjustment laterally relative to each other along the sleeve; a tapered wedge bushing fitting into the long taper bore end of the hub sleeve; a wedge element fitting into the short taper bore end of the sleeve and having a flange in spaced confronting relation to the annular shoulder within the sleeve bore; and adjusting screws constrained to rotation in the wedge element with their shanks threadedly engaging into the inner end of the bushing, whereby, upon turning the screws in one direction, the wedge element and the bushing are drawn toward each other to expand the sleeve within the sheave flanges, and whereby, when the screws are turned in the opposite direction, the wedge element is first retracted relative to the hub sleeve and said sleeve subsequently dislodged from the bushing through cooperation between the flange of the wedge element and the internal shoulder of the sleeve, to permit circumferential contraction of the latter for release of the sheave flanges.

WILLIAM A. WILLIAMS.

REFERENCES CITED

The following references are of record in the file of this patent:

UNITED STATES PATENTS

| Number | Name | Date |
|---|---|---|
| 308,639 | Stevens | Dec. 2, 1884 |
| 389,480 | Massett | Sept. 11, 1888 |
| 1,439,424 | Knudsen | Dec. 19, 1922 |
| 1,981,196 | Riblet | Nov. 20, 1934 |
| 2,172,230 | Watson | Sept. 5, 1939 |
| 2,289,965 | Herman | July 14, 1942 |
| 2,480,222 | Carlson | Aug. 30, 1949 |

FOREIGN PATENTS

| Number | Country | Date |
|---|---|---|
| 512,568 | Great Britain | Sept. 20, 1939 |